United States Patent
Crosby et al.

(10) Patent No.: US 9,651,096 B2
(45) Date of Patent: May 16, 2017

(54) TRIPOD SEAL FEATURE

(75) Inventors: Victor Crosby, Clarkston, MI (US);
Brian M. Valovick, Royal Oak, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 828 days.

(21) Appl. No.: 12/271,424

(22) Filed: Nov. 14, 2008

(65) Prior Publication Data
US 2010/0123289 A1    May 20, 2010

(51) Int. Cl.
*F16D 3/205* (2006.01)
*F16D 3/202* (2006.01)

(52) U.S. Cl.
CPC .... *F16D 3/2055* (2013.01); *F16D 2003/2026* (2013.01)

(58) Field of Classification Search
CPC ................. F16D 2003/2026; F16D 3/2055
USPC ....... 277/636, 634, 625, 637, 315, 394, 353, 277/351, 349; 464/175
See application file for complete search history.

(56) References Cited

U.S. PATENT DOCUMENTS

| | | | |
|---|---|---|---|
| 4,678,064 A * | 7/1987 | Adachi et al. | 188/73.45 |
| 5,529,538 A | 6/1996 | Schulz et al. | |
| 6,089,574 A | 7/2000 | Sadr et al. | |
| 6,402,999 B1 | 6/2002 | Sadr et al. | |
| 6,547,669 B1 * | 4/2003 | Neviani | 464/175 |
| 7,056,219 B2 * | 6/2006 | Toriumi et al. | 464/175 |
| 7,297,066 B2 | 11/2007 | Ohshita | |
| 7,396,286 B2 | 7/2008 | Sueoka et al. | |
| 7,582,020 B2 * | 9/2009 | Ono et al. | 464/111 |
| 7,597,628 B2 * | 10/2009 | Houis | 464/175 |
| 2002/0043772 A1 * | 4/2002 | Huchet et al. | 277/634 |
| 2004/0056434 A1 | 3/2004 | Wolf et al. | |
| 2005/0082769 A1 | 4/2005 | Scholtz et al. | |
| 2005/0179216 A1 * | 8/2005 | Neviani | 277/634 |
| 2006/0049584 A1 * | 3/2006 | Sueoka et al. | 277/635 |
| 2007/0042827 A1 | 2/2007 | Deisinger | |
| 2008/0157484 A1 | 7/2008 | Briton | |

FOREIGN PATENT DOCUMENTS

| | | |
|---|---|---|
| EP | 1182372 A2 | 2/2002 |
| FR | 2890145 B1 | 3/2007 |
| WO | 2008052588 A1 | 5/2008 |

* cited by examiner

*Primary Examiner* — Kipp Wallace
(74) *Attorney, Agent, or Firm* — Kristin L. Murphy; Brooks Kushman P.C.

(57) ABSTRACT

An adapter for sealing an outer joint portion of a joint assembly, the adapter includes a main body having an aperture for receiving an outer joint portion, the aperture including an inner sealing surface. The inner sealing surface has a plurality of track portions and a plurality and root portions, where each root portion includes a root midpoint and two track connecting points. The track connecting points connect the root portion to the track portion. The root portion includes a first root radius and an offset root radius, where the first root radius is measured from a first center, and the offset root radius is measured from an offset center. The offset center is located closer to the center axis of the adapter than the first center. Each root portion includes the first root radius at the track connecting point, and gradually transitions to the offset root radius.

12 Claims, 9 Drawing Sheets

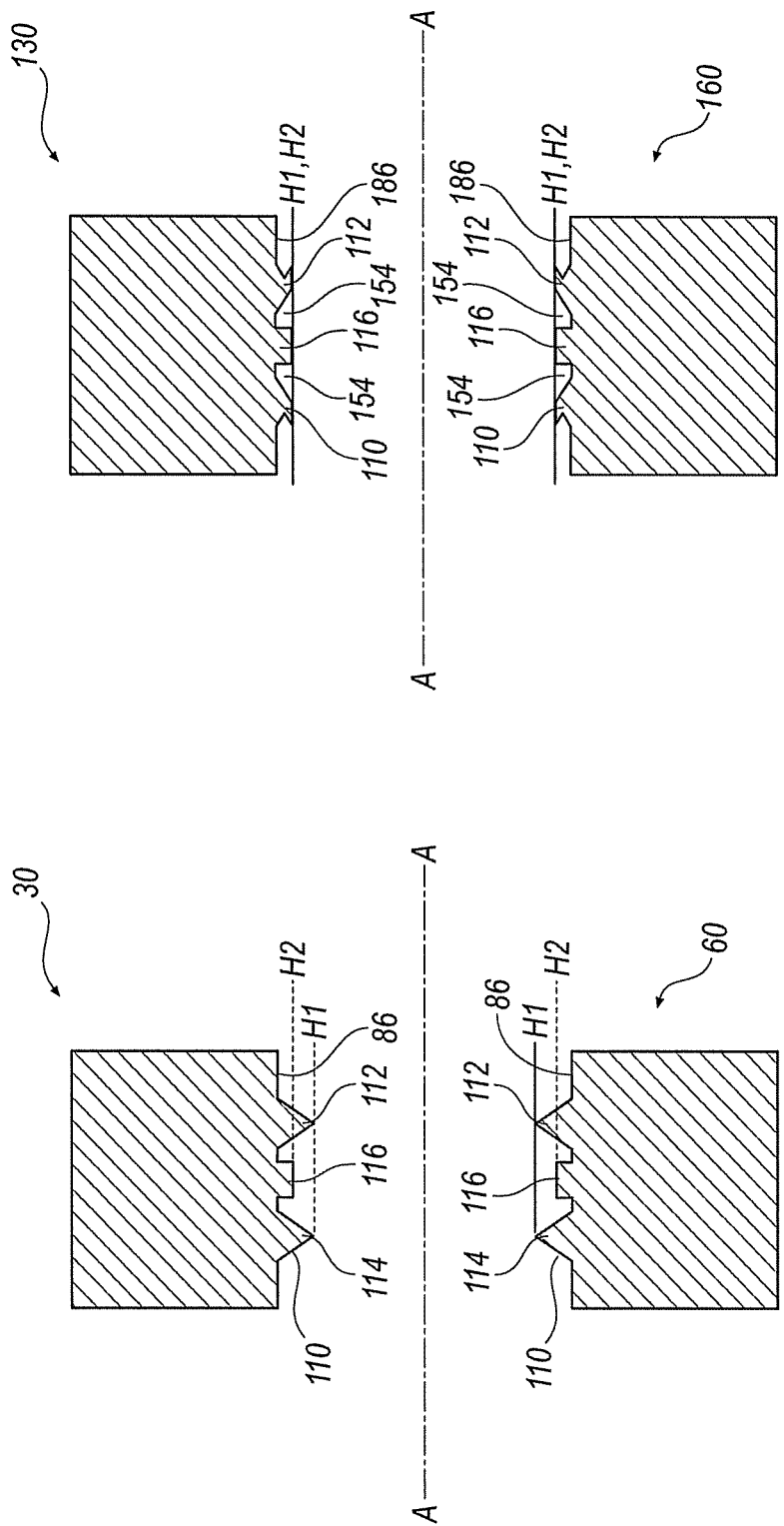

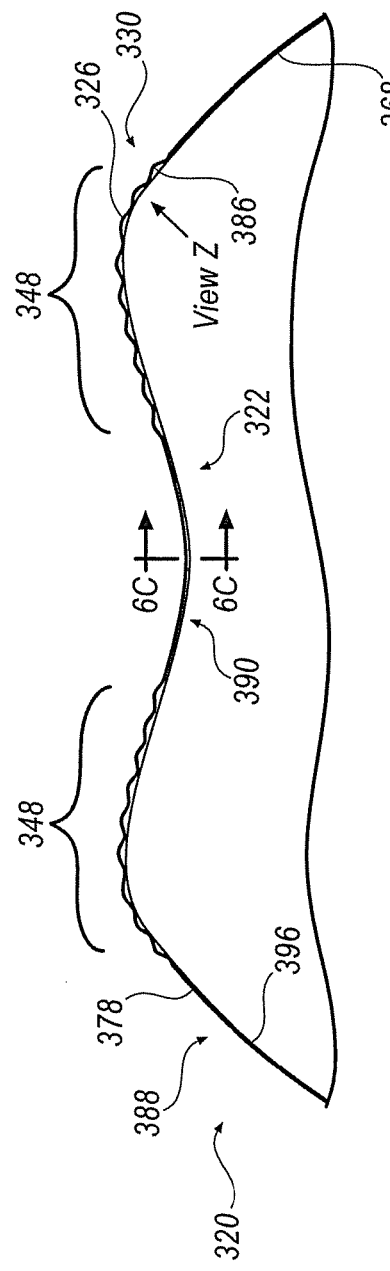
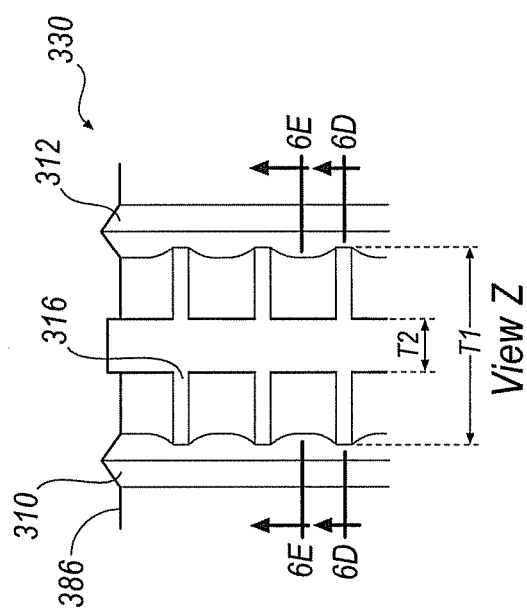
FIG. 6A
FIG. 6B

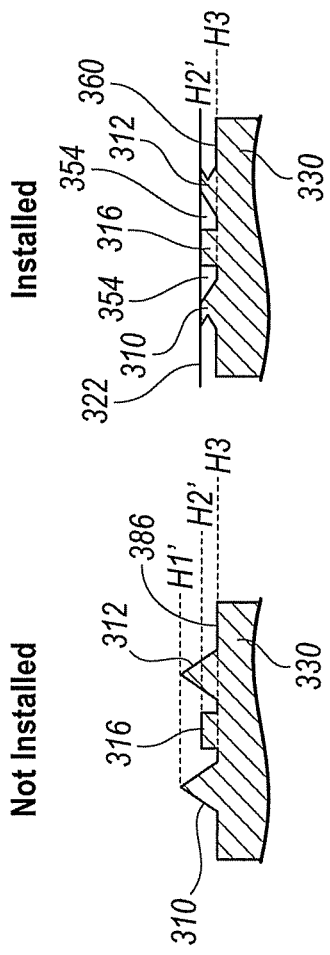
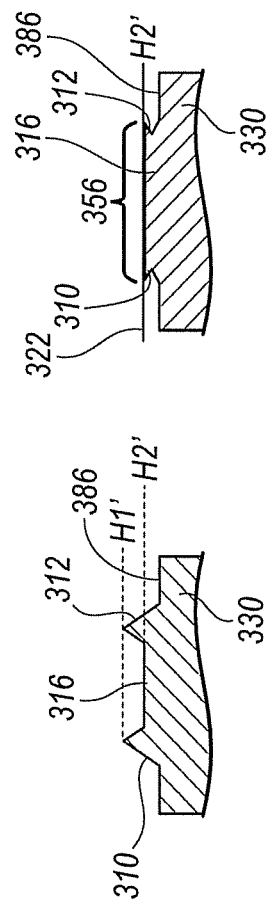
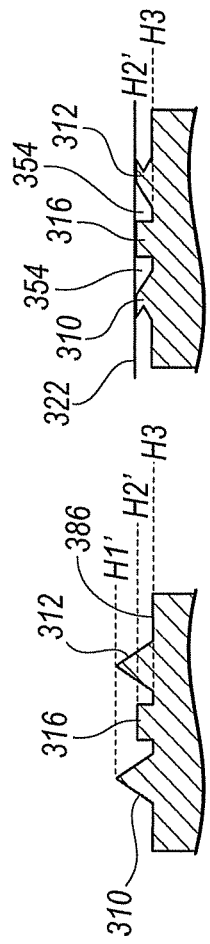
FIG. 6C
FIG. 6D
FIG. 6E

TRIPOD SEAL FEATURE

TECHNICAL FIELD

The present disclosure relates to an adapter for sealing an outer joint portion of a joint assembly.

BACKGROUND

Constant velocity joints are commonly used in driveshaft assemblies of motor vehicles. One type of constant velocity joint is a tripod joint. The tripod joint may include a spider, commonly referred to as a tripod, which typically includes three trunnions. The spider may be received by an outer joint portion, which is also called a tulip. The tulip includes an inner recess with three vaults, where the vaults are connected to each other by a tulip minor surface. Each of the three vaults receives one of the trunnions of the spider. The tulip may include an outer profile that substantially coincides with the overall shape of the spider. That is, the outer profile of the tulip is non-circular, and includes a profile that corresponds with the three vaults of the spider. The part of the outer profile that corresponds with the three vaults is called the vault portion and the part of the outer profile that corresponds with the minor surface is called the tulip minor surface portion.

An insert may be placed over the tulip. The insert includes an aperture that receives the tulip and substantially coincides with the non-circular outer surface of the tulip. The aperture includes an inner sealing surface. The part of the inner sealing surface that seals along the tulip minor surface portion is called the root portion, and the part of the inner sealing surface that seals along the vault portion is called the track portion. A sealing boot may then be inserted over the adapter and a clamp may then be placed over the sealing boot and the adapter. The clamp compresses the boot and insert against the tulip.

The insert may also include a sealing bead that is located at the inner sealing surface. When the adapter is clamped against the tulip, the bead deforms against the outer profile of the tulip, forming a seal between the adapter and the tulip. The seal formed by the bead is for reducing the amount of grease that is located inside the joint from escaping into the environment. The bead may also reduces the amount of contaminates, such as dirt and water, from entering into the joint. However, in some instances, the sealing bead of the adapter does not always contact and seal along the outer profile of the tulip. This sealing issue is present along the entire outer profile of the inner sealing surface, but is sometimes especially prevalent at the root portion of the inner sealing surface. The adapter may not contact the tulip at the root positions of the adapter especially if the adapter is constructed from a flexible, rubber-based material. This is because the root portion is located the furthest distance away from the clamp than any other portion of the inner sealing surface, and receives the least amount of pressure from the clamp. Also, the geometry of the inner sealing surface at the root does not allow for optimal sealing between the tulip and the inner sealing surface.

Therefore, there exists a need to provide an adapter for sealing the tulip of a joint assembly that includes an improved sealing feature located along the root portion of the adapter.

BRIEF DESCRIPTION OF THE DRAWINGS

FIG. 4A is a partially cross sectional view of the adapter in an uncompressed state;

FIG. 4B is a partially cross sectional view of the adapter in a compressed state;

FIG. 6A is an alternative illustration of the adapter;

FIG. 6B is a view of the adapter illustrated in FIG. 6A;

FIG. 6C a partially cross sectional view of the adapter taken along lines C-C of FIG. 6A;

FIG. 6D a partially cross sectional view of the adapter taken along lines D-D of FIG. 6B; and FIG. 6E a partially cross sectional view of the adapter taken along lines E-E of FIG. 6B.

DETAILED DESCRIPTION

Figure 1:
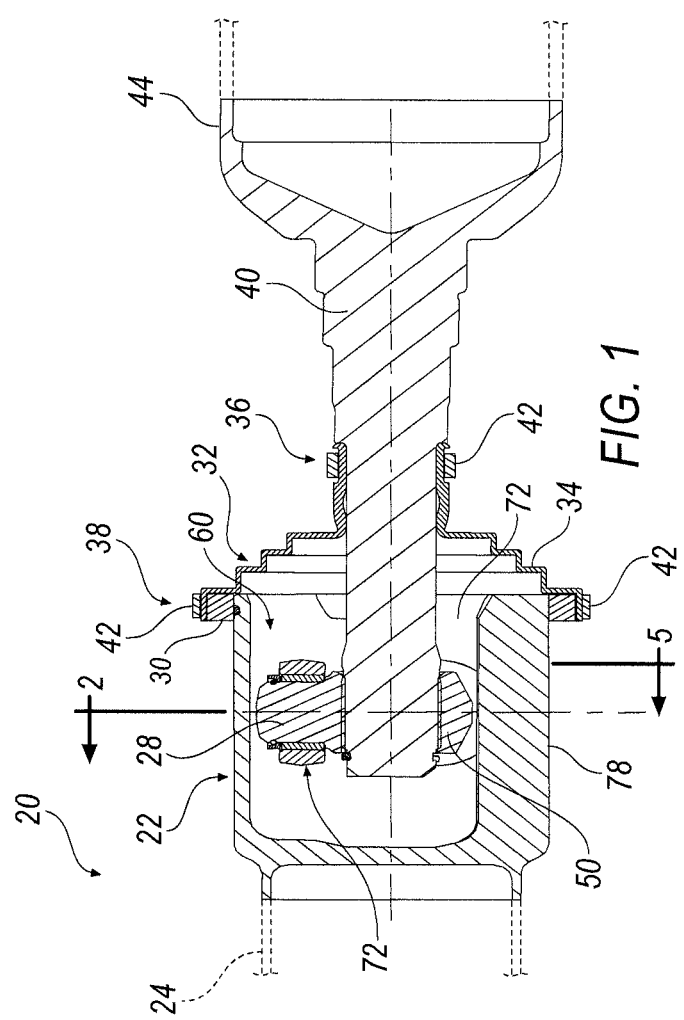
FIG. 1 is a partially sectional view of a joint assembly including a spider, a tulip, an adapter, and a boot for sealing the joint assembly.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

According to various exemplary illustrations described herein, an adapter for sealing an outer joint portion of a joint assembly is provided. The adapter may include a main body, where the main body includes an aperture for receiving an outer joint portion. The aperture may include an inner sealing surface, where the inner sealing surface may include a plurality of track portions and a plurality of root portions located along the inner sealing surface. Each root portion may include a root midpoint and two track connecting points, where the track connecting points may connect the root portion to the track portion. The root portions may be located closer to a center axis of the adapter than the track portions. The inner sealing surface may also include a first root radius and an offset root radius located along the root portion. The first root radius may be measured from a first center, and the offset root radius may be measured from an offset center, where the offset center may be located closer to the center axis of the adapter than the first center. Each root portion may include the first root radius at the track connecting point and gradually transitions to the offset root radius, where the offset root radius may be measured at the root midpoint. The root midpoint may be located closest to the center axis of the adapter than any other location along the inner sealing surface.

The adapter may also include a first sealing bead located along the inner sealing surface. The adapter may also include a second sealing bead located along the inner sealing surface. A center profile may be interposed between the second sealing bead and the first sealing bead, wherein the first sealing bead and the second sealing bead include a first height, the center profile includes a second height, and the first height may be greater than the second height at the root portions. The first height may be about equal to the second height along a portion of a peak portion of the inner sealing surface, wherein the peak portion is where the inner sealing surface transitions from the track portion to the root portion. Also, the adapter may be integrated with a boot for sealing a joint assembly.

Turning now to the drawings, FIG. 1 illustrates a joint 20, illustrated as an articulated tripod joint. The joint 20 includes an outer joint portion, or a tulip 22 that is connected to a front prop shaft 24, and an inner joint portion 28. The inner joint portion 28 includes a shaft 40 connected to a rear prop shaft 44. The inner joint portion 28 also includes a tripod, or spider 50 that may be splined to the shaft 40. FIG. 1 illustrates the tulip 22 generally defined by an axis A-A. It should be noted that while FIG. 1 illustrates joint 20 as a tripod joint, any type of constant velocity joint may be used as well.

Figure 2:
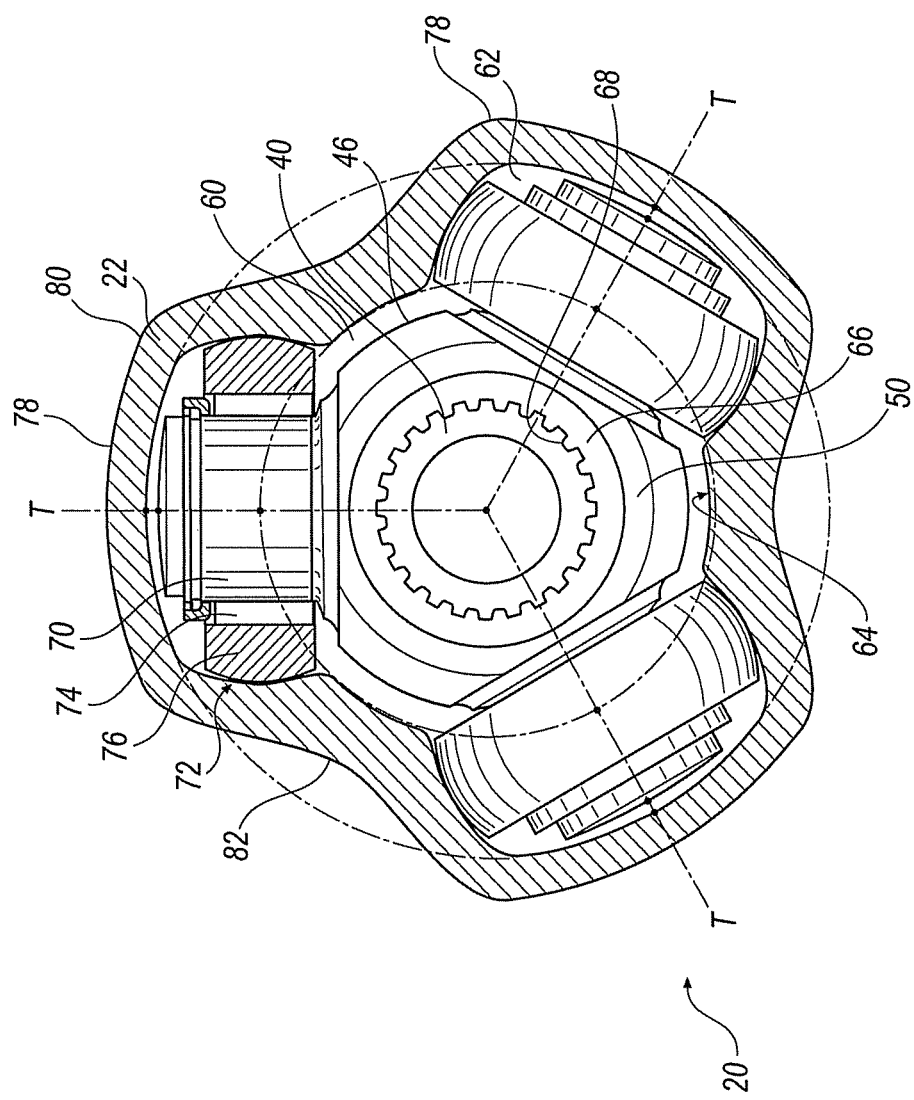
FIG. 2 is a partially sectional view of the spider and the tulip, taken along lines 2-2 of FIG. 1.

FIG. 2 is an illustration of the tulip 22 provided with an inner recess 60 having three uniformly circumferentially distributed vaults 62. The vaults 62 are connected to one other by a tulip minor surface 64. The spider 50 includes an annular hub portion 66 provided with an aperture 68 for inserting the shaft 40. In the illustration as shown, the spider 50 is splined to the shaft 40. Extending from the hub portion 66 are three uniformly circumferentially distributed trunnions 70, each having an axis T. The trunnions 70 are distributed such that one trunnion 70 may be in each vault 62. A roller assembly 72 may be placed on each of the trunnions 70, where each roller assembly 72 includes bearing needles 74 and rollers 76. The joint 20 may be trisected about the axis A-A into three generally equal portions, illustrated as the axes T. Each of the trunnions 70 are connected to one another by a minor surface 46.

In the illustration as shown, an outer surface 78 of the tulip 22 includes a profile that substantially corresponds with the shape of the spider 50, and is non-circular. More specifically, the outer surface 78 includes a vault portion 80, which corresponds with the vaults 62, and a tulip minor surface portion 82, which corresponds with the tulip minor surface 64.

As best seen in FIG. 1, the joint 20 includes an insert, also called an adapter 30 and a boot assembly 32. The boot assembly 32 includes a flexible boot 34 that may be clamped to the shaft 40 on one end, 36 and to the tulip 22 and the adapter 30 on the other end 38, by a pair of clamps 42. FIG. 1 illustrates the adapter 30 located between the boot 34 and the outer surface 78 of the tulip 22. The boot 34 may be constructed from a material such as, but not limited to, a rubber, polymer, or silicone type material. The boot may be enclosed on each of the ends 36 and 38 by the pair of clamps 42.

In the illustration as shown, the boot 34 and the adapter 30 are separate components, however it should be noted that the adapter 30 may be integrated with the boot 34 as well. It should also be noted that while FIG. 1 illustrates the boot 34 as a convoluted boot, other types of boots, such as a rolling boot may be used as well.

The adapter 30 may be used for sealing between the tulip 22 and the boot 34. More specifically, the adapter 30 may seal the inside of the joint 20, thereby retaining grease in the inner recess 60 of the joint 20. The sealing of the adapter 30 may also keep contaminates, such as dirt and water out of the inner recess 60. In one example, the adapter 30 may be constructed from either a rubber or a polymer such as a thermoplastic elastomer. Material selection of the adapter 30 is discussed in greater detail below.

Figure 3A:
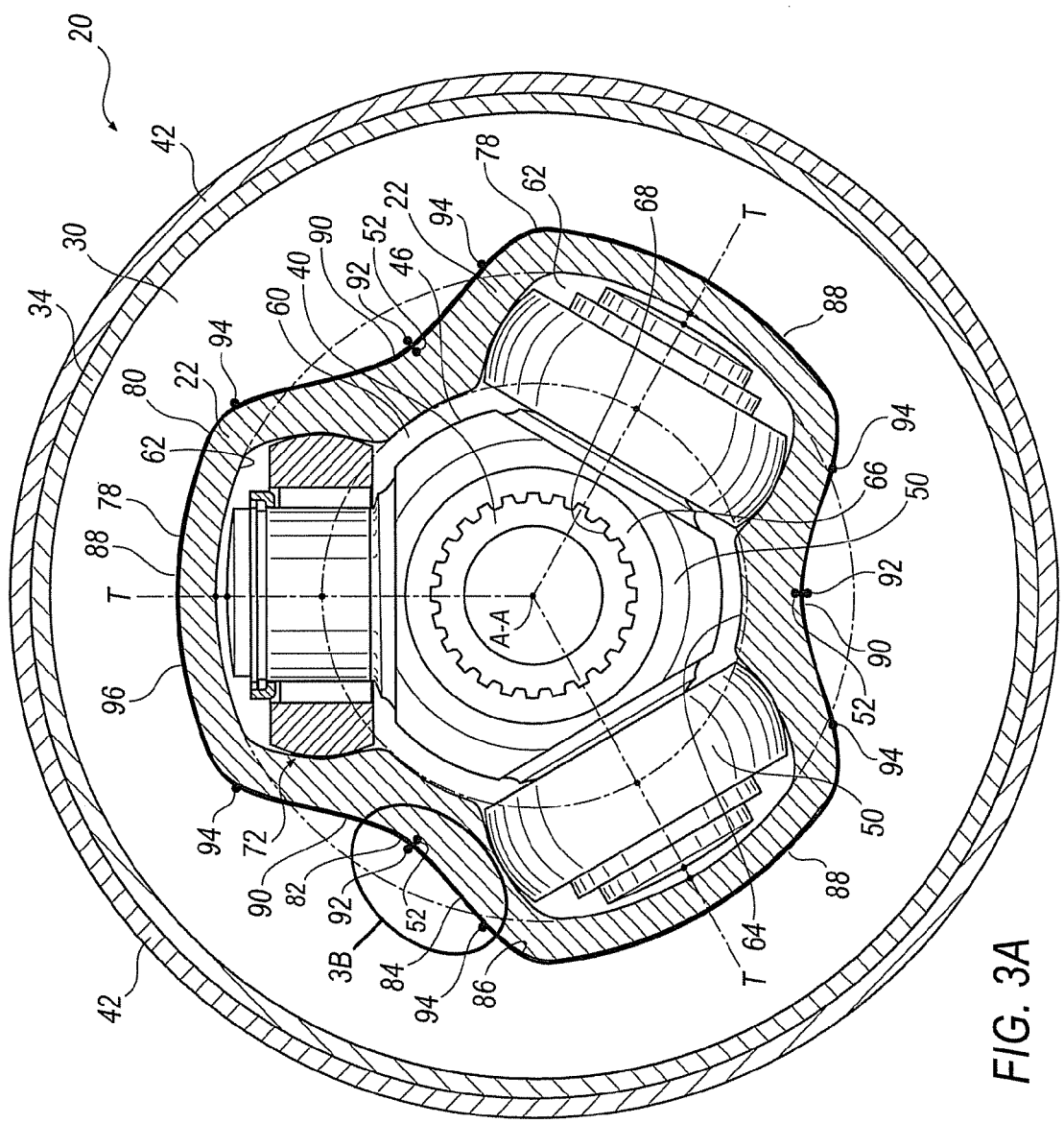
FIG. 3A is a partially sectional view of the spider, the tulip, the adapter, the boot and the clamp, taken along lines 2-2 of FIG. 1.

FIG. 3A illustrates a partially sectional view of the boot 34, the adapter 30, the tulip 22, the spider 50 and one of the clamps 42. The adapter 30 includes an aperture 84 that receives the tulip 22, and an inner sealing surface 86. The inner sealing surface 86 may be used for sealing the adapter 30 along the outer surface 78 of the tulip 22. FIG. 3A illustrates the inner sealing surface 86 with a plurality of track portions 88, and a plurality of root portions 90. In the illustration as shown, there are three uniformly circumferentially distributed the track portions 88, and three uniformly circumferentially distributed root portions 90. More specifically, the inner sealing surface 86 is configured for receiving the spider 50, where the track portions 88 coincide with the three vault portions 80 of the outer surface 78 of the tulip 22, and the root portions 90 coincide with the three vaults 62 of the tulip 22.

Each root portion 90 includes a root midpoint 92 and two track connecting points 94. The root midpoint 92 corresponds with an innermost point 52 of the tulip minor surface portion 82 of the tulip 22. The track connecting points 94 connect the root portions 90 to the track portions 88. The root portions 90 are located closer to the axis A-A of the adapter 30 than the track portions 88. In the illustration as shown, the root portions 90 are curved inwardly, towards the axis A-A, and the track portions 88 each include an outermost surface 96. The outermost surface 96 is illustrated in FIG. 3A as curved outwardly away from the axis A-A.

The inner sealing surface 86 of the adapter 30 provides a seal between the tulip 22 and the adapter 30. More specifically, when the clamp 42 is tightened, the clamp 42 compresses the boot 34. The boot 34 in turn compresses the adapter 30, which compresses the inner sealing surface 86 of the adapter 30 along the outer surface 78 of the tulip 22. This compression in turn creates a seal between the adapter 30 and the tulip 22, which reduces the amount of contaminates that may enter the inner recess 60, and also aids in retaining grease inside of the inner recess 60 as well. Because the tulip 22 includes a profile that is non-circular and substantially corresponds with the shape of the spider 50, it may be more difficult to seal the root portions 90 of the adapter 30 to the tulip minor surface portion 82, as discussed in greater detail below.

Figure 3B:
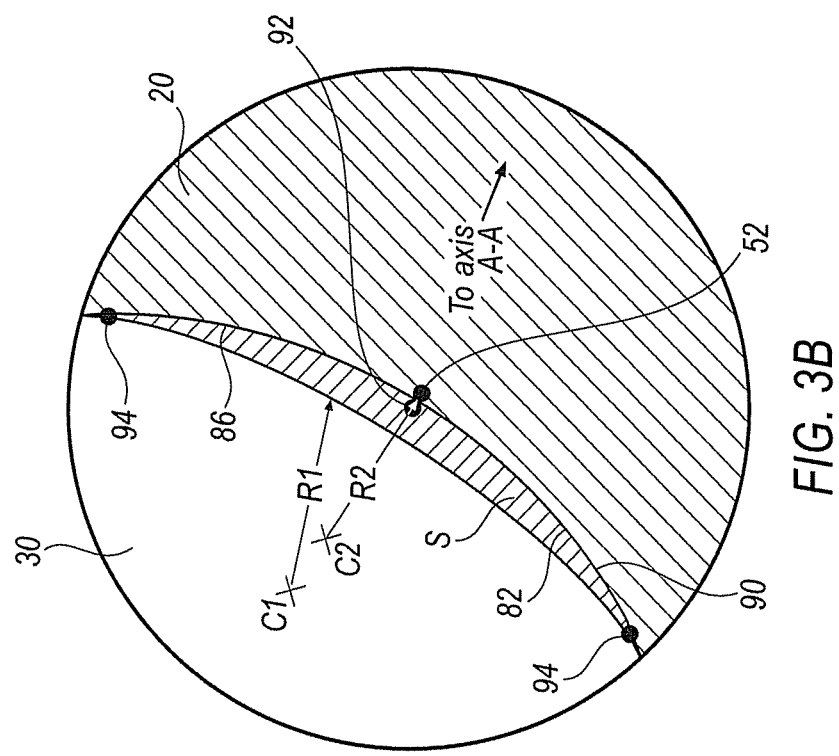
FIG. 3B is an enlarged view of Region 3B in FIG. 3A.

FIG. 3B is an enlarged view of Region B as seen in FIG. 3A. FIG. 3B illustrates the inner sealing surface 86 in greater detail, and in particular the inner sealing surface 86 along one of the root portions 90. The inner sealing surface 86 includes a first root radius R1 and an offset root radius R2. The first root radius R1 is measured from a first center C1 and the offset root radius R2 is measured from an offset center C2. FIG. 3B illustrates the offset center C2 located closer to the center axis A-A (the axis A-A is illustrated in FIG. 3A) than the first center C1. Also, the root midpoint 92 may be a point that is located closest to the center axis A-A of the adapter 30 (the axis A-A is illustrated in FIG. 3A) than any other location along the inner sealing surface 86.

The root portion 90 includes the first root radius R1 at the track connecting points 94. The root portion 90 gradually transitions from the first root radius R1 to the offset root radius R2, where the offset root radius R2 is measured at the root midpoint 92. The offset root radius R2 provides an offset sealing surface along the inner sealing surface 86, which in turn provides increased sealing at the tulip minor surface portion 82. That is, as the root portion 90 of the inner sealing surface 86 transitions from the first root radius R1 to the offset root radius R2, an increased amount of sealing material S of the adapter 30 is formed, which is indicated by the shaded area illustrated in FIG. 3B. The increased amount of sealing material S of the adapter 30 may improve sealing at the tulip minor surface portion 82 when compared to an adapter with a root portion that only includes the first root radius R1, and does not include an increased amount of sealing material S, as discussed in greater detail below. In particular, the increased amount of sealing material S of the adapter 30 especially improves sealing at the root midpoint 92 of the root portion 90.

In at least some prior art adapters, when the clamp 42 compresses the boot 34 and the adapter 30 (as seen in FIG. 3A), the inner sealing surface 86 of the adapter 30 does not always completely seal around the outer surface 78 of the tulip 22. In particular, the adapter 30 does not always seal and make contact with the outer surface 78 of the tulip 22 at the root portions 90, especially at the root midpoint 92. This is because the root midpoint 92 is the furthest point located at the inner sealing surface 86 from the clamp 42, and receives the least amount of pressure when the clamp 42 is compressed. Moreover, as best seen in FIG. 3A, the root portions 90 include a generally inwardly curved geometry, which does not always facilitate the inner sealing surface 86 to completely contact the outer surface 78 of the tulip 22.

Increasing the sealing surface along the inner sealing surface 86 of the root portions 90 may provide enhanced sealing at the tulip minor surface portions 82 of the tulip 22. Also, the root midpoint 92 is offset closer towards the center axis A-A of the adapter 30 by the offset root radius R2, thereby facilitating the inner sealing surface 86 to make contact with the tulip minor surface portion 82. Increasing the sealing surface along the inner sealing surface 86 may be even more advantageous in adapters that are constructed from more flexible materials, such as rubber, especially when compared to adapters that are constructed from stiffer materials, such as thermoplastic elastomers. This is because adapters that are constructed from flexible materials such as rubber may tend to exhibit an incomplete seal at the root portions of the adapter more when compared to adapters that are constructed from stiffer materials, such as thermoplastic elastomers.

FIG. 4A is a partially cross sectional view of the adapter 30 in a decompressed state, taken at one of the root portions 90. In the illustration as shown, the inner sealing surface 86 includes a first sealing bead 110. The first sealing bead 110 provides the seal between the outer surface 78 of the tulip 22 and the inner sealing surface 86 of the adapter 30, between the inner recess 60 of the tulip 22 and the environment. More specifically, as seen in FIG. 3A, as the clamp 42 compresses the boot 34 and the adapter 30, the first sealing bead 110 seals along the outer surface 78 of the tulip 22. The first sealing bead 110 provides for the seal between the outer surface 78 of the tulip 22 and the inner sealing surface 86 of the adapter 30. If the adapter 30 is constructed from a semi-rigid polymer, the first sealing bead may include a reduction of material thickness at a first seal bead tip 114. The reduction in material thickness will allow for the first sealing bead 110 to deform.

As illustrated in FIG. 4A, the inner sealing surface 86 may also include a second sealing bead 112. The second sealing bead may provide for additional sealing at the inner sealing surface 86. However, the second sealing bead 112 is optional, and may be omitted from the inner sealing surface 86 as well. In the illustration as shown, the second sealing bead 112 is generally identical to the first sealing bead 110. It should be noted that the second sealing bead 112 may also include a profile that is different from the first sealing bead 110 as well.

The inner sealing surface 86 may also include a center profile 116, which is located between the first sealing bead 110 and the second sealing bead 112. FIG. 4A is an illustration of the inner sealing surface 86 before the adapter 30 is clamped to the tulip 22, and the first sealing bead 110, the second sealing bead 112 and the center profile 116 are not deformed. In the illustration as shown in FIG. 4B, the adapter 30 is clamped to the tulip 22, thereby deforming the first sealing bead 110 and the second sealing bead 112.

As seen in FIG. 4A, the first sealing bead 110 and the second sealing bead include about the same first height, illustrated as H1, and the center profile 116 includes a second height H2, where the first height H1 may be greater than the second height H2. As seen in FIG. 4B, when the adapter is compressed, the first sealing bead 110 and the second sealing bead 112 deform such that the first sealing bead 110 and the second sealing bead 112 are about the same height as the center profile 116, and the first height H1 may be about the same height as H2. As discussed in greater detail below, the height and shape of the first sealing bead 110 and the second sealing bead 112 may vary.

When an adapter 130 is placed against a tulip 122, two empty spaces 154 are formed between the first sealing bead 110 and the second sealing bead 112, where the center profile 116 separates the two empty spaces 154. If air or contaminates from the environment were to penetrate beyond the first sealing bead 110, these contaminates would be trapped inside of the first of the two empty spaces 154, located between the first sealing bead 110 and the center profile 116. Also, if any contaminates located in the first of the two empty spaces 154 were to migrate past the center profile 116, contaminates would then be trapped within the second of the two empty spaces 154. This arrangement may be advantageous because contaminates from the environment have to migrate past the first sealing bead 110, the center profile 116, and the second sealing bead 112 before entering the inner recess 160 of the tulip 122. In other words, contaminates would have to travel past through three different sealing surfaces before entering the inner recess 160 of the tulip 122. Likewise, grease that is located within the inner recess 160 of the tulip 122 would also have to pass through three different sealing surfaces in order to make contact with the environment as well.

Figure 5A:
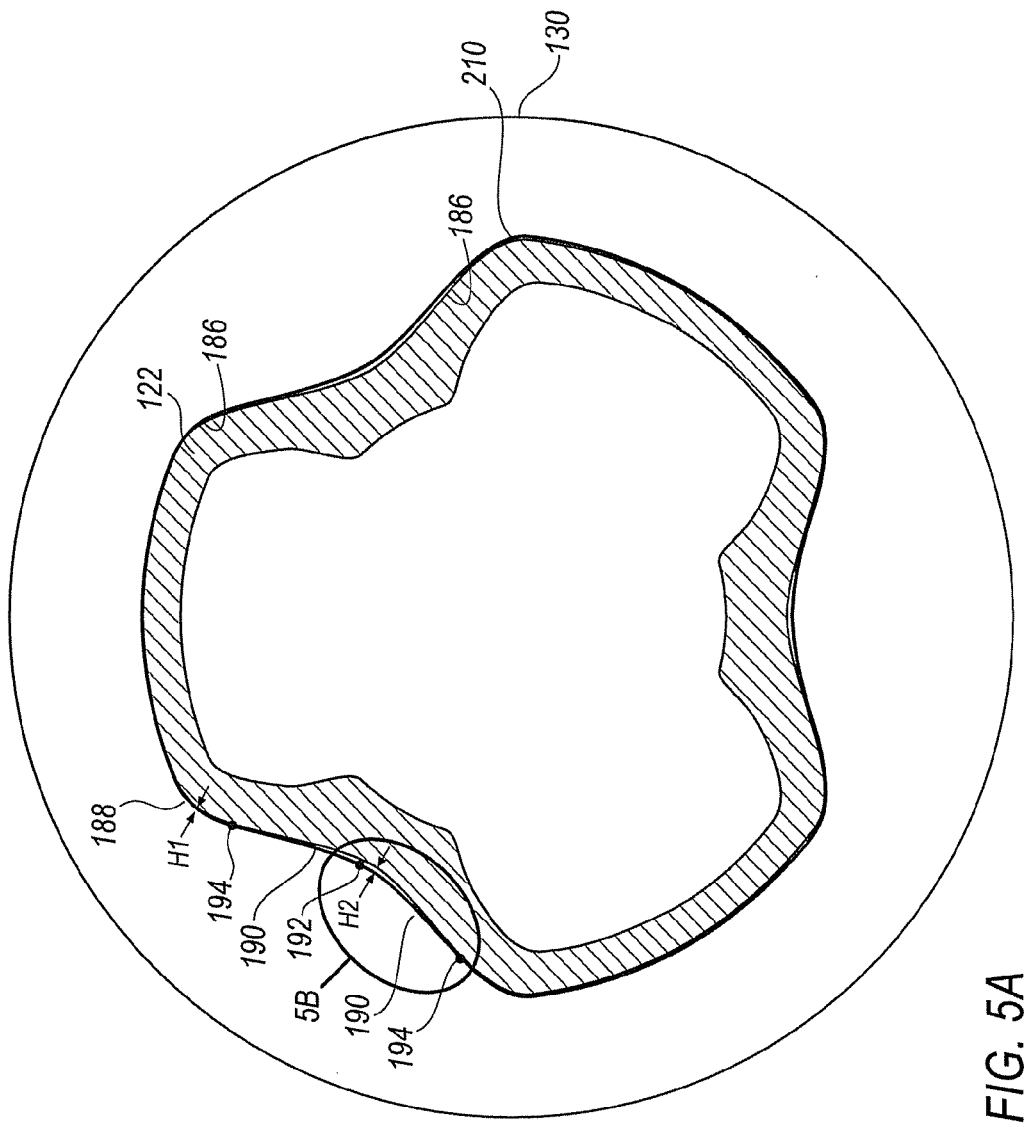
FIG. 5A is an alternative illustration of FIG. 3A.
Figure 5B:
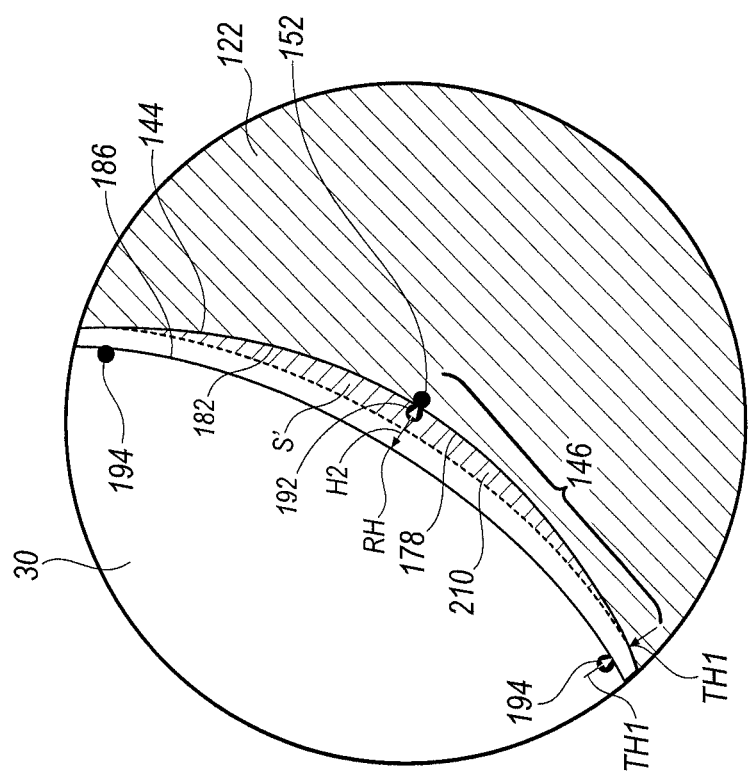
FIG. 5B is an enlarged view of Region B in FIG. 5A.

In the illustration as shown in FIG. 3B, the adapter 30 includes the first root radius R1 and the offset root radius R2, however, it should be noted that the inner sealing surface 86 can also be offset by increasing the bead height. Indeed, in an alternative illustration as seen in FIG. 5A, a first sealing bead 210 and a second sealing bead 212 may be included along an inner sealing surface 186 of the adapter 130, where the first and second sealing beads 210 and 212 include a variable bead height that creates the increased sealing surface, as discussed below. The first and second sealing beads 210 and 212 create a seal between the adapter 130 and an outer surface 178 of the tulip 122. The first and second sealing beads 210 and 212 include a track height illustrated as TH1 (best seen in FIG. 5B), and a root height illustrated as RH (best seen in FIG. 5B). In one example, the track height TH1 may correspond to the first height H1 the first sealing bead 110 and the second sealing bead 112 as illustrated in FIG. 4A. Turing back to FIGS. 5A-5B, the root height RH is greater than the track height TH1, where the track height TH1 is located at the first sealing bead 210 along a plurality of track portions 188. The track height TH1 may also be located at a pair of track connecting points 194 along a root portion 190, where first and second sealing beads 210 and 212 gradually transition from the track height TH1 to the root height RH. As best seen in FIG. 5B, the root height RH is measured at a root midpoint 192.

FIG. 5B best illustrates the first sealing bead 210 gradually increasing in height from the track connecting points 194 to the root midpoint 192. More specifically, in the illustration as shown, the first sealing bead 210 changes in height from the root height RH to the track height TH1 along a region 146. The root height RH is partially shown in phantom line, and a shaded area S' indicates an increased amount of sealing material that may be located between the root height RH and the track height TH1.

As illustrated, the track height TH1 and the root height RH are each measured from the inner sealing surface 186 to an outer bead surface 144. Thus, as may be seen in each of FIGS. 5A and 5B, the first sealing bead 210 changes in height to create an increased amount of sealing material. The increased amount of sealing material S' may improve the seal between the outer surface 178 of the tulip 122 and the outer bead surface 144, especially at an innermost point 152 of the tulip minor surface portion 182 of the tulip 122.

In yet another alternative illustration of a joint 320 as seen in FIG. 6A, a portion of an adapter 330 is illustrated along a tulip 322. The adapter 330 is illustrated in a decompressed state, before being clamped to the tulip 322 by a clamp, such as the clamp 42. The shape of a first sealing bead 310 and a second sealing bead 312 (as seen in FIG. 6B) may change about an inner sealing surface 386. More specifically, as best seen in FIG. 6A, the first sealing bead 310 and a second sealing bead 312 (illustrated in FIG. 6B) may include a plurality of undulations 326. It should be noted that the undulations 326 may also be located along the inner sealing surface 386 as well.

The undulations 326 may only be located along a peak portion 348 of an aperture 368. The peak portions 348 are a portion of the inner sealing surface 386 located between a track portion 388 and a root portion 390. More specifically, the peak portion 348 may be where the inner sealing surface 386 transitions from the track portion 388 to the root portion 390. In the illustration as shown, the peak portions 348 include a smaller radius than the track portion 388 or the root portion 390. The undulations 326 may not be located at the root portion 390, nor at an outermost surface 396 of the track portion 388. Instead, FIG. 6A illustrates the undulations 326 located only along the peak portion 348. Including the undulations 326 along only the peak portions 348 will allow for the adapter 330 to be more pliable and conform to the outer surface 378 of the tulip 322 at the peak portion 348. This may be advantageous, because in at least some instances, there may be an incomplete seal between the adapter 330 and the tulip 322 at the peak portions 348. Also, as discussed in greater detail below, the undulations 326 may also be used to prevent leaks between the environment and the inner recess of the joint 320 at the peak portions 348.

As seen in FIG. 6B, the first sealing bead 310 and the second sealing bead 312 vary in distance from one another along the inner sealing surface 386. A maximum thickness T1 represents the maximum thickness of the center profile 316. The maximum thickness T1 extends between the first sealing bead 310 and the second sealing bead 312. A minimum thickness T2 represents the minimum thickness of the sealing bead 316. The minimum thickness T2 extends along a portion of the inner sealing surface 386 between the first sealing bead 310 and the second sealing bead 312. The varies in thickness between the maximum thickness T1 and the minimum thickness T2. Varying the thickness of the center profile 316 will provide a non-uniform sealing surface area, and is illustrated in greater detail in FIGS. 6C-6E.

FIG. 6C illustrates the inner sealing surface 386 at section C-C (seen in FIG. 6B), which is illustrated at the root portion 390 of the adapter 330. When the adapter 330 is not compressed against the tulip 322, the first and second sealing beads 310 and 312 include the first height H1'. The center profile 316 includes the second height H2', as well a third height H3 that may be located along a portion of the center profile. The third height H3 may be less than both the first height H1 and the second height H2. The first height H1' is illustrated as greater than the second height H2'. The second height H2' is greater than the third height H3. When the adapter 330 is compressed against the tulip 322, the first and second sealing beads 310 and 312 deform to about the second height H2'. In the illustration as shown, the center profile 316 is not deformed. As discussed above, when the adapter 330 is placed against the tulip 322, two empty spaces 354 are formed between the first sealing bead 310 and the second sealing bead 312, where the center profile 316 separates the two empty spaces 354. The third height H3 defines the lower surface of the two empty spaces 354.

FIG. 6D is an illustration of the inner sealing surface 386 at section D-D (seen in FIG. 6B), which is located at the first thickness T1. In the illustration as shown, the center profile 316 still includes the second height H2'. However, because the first and second sealing beads 310 and 312 now include the first thickness T1 between each other, the center profile 316 and the two sealing beads 310 and 312 are connected to each other. In other words, the minimum height of the inner sealing surface 386 between the first sealing bead 310 and the second sealing bead 312 may always be at least the second height H2'. Therefore, when the adapter 330 is compressed against the tulip 322, as seen in the installed state of FIG. 4D, the first sealing bead 310 and the second sealing bead 312 deform, and create a single unitary sealing surface, illustrated as a unitary sealing surface 356. The unitary sealing surface 356 may be deformed to the second height H2' when the adapter 330 is installed, as seen in FIG. 6D. Including the unitary sealing surface 356 may be advantageous, as the surfaces of the first sealing bead 310, the second sealing bead 312 and the center profile 316 are each included in the unitary sealing surface 356.

Including the unitary sealing surface 356 may also be advantageous because the unitary sealing surface 356 will also create an additional barrier between each of the two empty spaces 354. More specifically, the unitary sealing surface 356 separates each of the two empty spaces 354 between each of the undulations 326. Therefore, the two empty spaces 354 are enclosed by the first and second sealing beads 310 and 322 as well as the unitary sealing surface 356.

FIG. 6E is an illustration of the inner sealing surface 386 at section E-E (seen in FIG. 6B), which is located at the second thickness T2 between the first and second sealing beads 310 and 312. FIG. 6E is illustrated as generally identical to the section C-C as illustrated in FIG. 6C.

It should be noted that the undulations 326 may be most commonly used in an adapter that is constructed from a material that is stiffer than rubber, such as a polymer. In one example, the adapter 330 may be constructed from a thermoplastic elastomer. Also, an adapter constructed from a stiffer material will also tend to include the first and second sealing beads 310 and 312 with the first height H1' and the center profile 316 with the second height H2', where the first height H1' may be greater than the second height H2'. This may be because the first and second sealing beads 310 and 312 and the center profile 316 tend to improve the sealing capabilities of adapters constructed from stiffer materials, such as thermoplastic elastomers, more than adapters constructed of less stiff materials, such as rubber.

It should be noted that the undulations 326 may be used in combination with the offsetted radius located along the root portions 90 as described above. Alternatively, the undulations 326 may also be used alone, without the offsetted radius at the root portions 90 as well, especially in adapters constructed from stiffer materials, such as polymers. Including the undulations 326 along the inner sealing surface 386 may improve sealing at the peak portions 348 when compared to the adapter 330 that does not include the undulations 326.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

What is claimed is:

1. An adapter for sealing an outer joint portion of a joint assembly, comprising:
   a main body including an aperture for receiving an outer joint portion, the aperture defined by first and second thicknesses and having an inner sealing surface;
   a plurality of track portions located along the inner sealing surface defined by the first thickness;
   a plurality of root portions located along the inner sealing surface defined by the second thickness, each root portion including a root midpoint and two track connecting points, where the track connecting points connect the root portion to the track portion and the root portions are located closer to a center axis of the adapter than the track portions; and
   a first root radius and an offset root radius located along the root portion, wherein the first root radius includes a first center and the offset root radius includes an offset center, where the offset center is located closer to the center axis of the adapter than the first center;
   wherein each root portion includes the first root radius having a different dimension than the offset root radius, the first root radius measured at the track connecting points gradually transitions from the first root radius into the offset root radius, measured at the root midpoint;
   wherein the root midpoint is located closest to the center axis of the adapter than any other location along the inner sealing surface; and
   wherein there is an increased amount of sealing material extending radially from the inner sealing surface, at the root zone and between the track connecting points such that a thickness of the increased amount of sealing material varies between the track connecting points and is greatest at the root midpoint.

2. The adapter as recited in claim 1, further comprising a first sealing bead located along the inner sealing surface.

3. The adapter as recited in claim 2, further comprising a second sealing bead located along the inner sealing surface.

4. The adapter as recited in claim 3, wherein the second sealing bead is generally identical to the first sealing bead.

5. The adapter as recited in claim 3, further comprising a center profile that is interposed between the second sealing bead and the first sealing bead, wherein the first sealing bead and the second sealing bead include a first height, the center profile includes a second height, and the first height is greater than the second height at the root portions.

6. The adapter as recited in claim 5, wherein the center profile includes a third height along a portion of the center profile, the third height being less than both the first height and the second height.

7. The adapter as recited in claim 6, wherein a plurality of undulations are located along the inner sealing surface at peak portion.

8. The adapter as recited in claim 1, wherein the aperture is configured for receiving a tulip of a tripod joint.

9. The adapter as recited in claim 1, wherein the adapter is integrated with a sealing boot of the joint assembly.

10. A boot for a tripod joint assembly, comprising:
    an adapter portion, the adapter including a main body having an aperture including an inner sealing surface and configured for receiving a tulip of a tripod joint;
    three uniformly circumferentially spaced track portions located along the inner sealing surface;
    three uniformly circumferentially spaced root portions located along the inner sealing surface, each root portion including a root midpoint and two track connecting points, where the track connecting points connect the root portion to the track portion and the root portions are located closer to a center axis of the adapter than the track portions; and
    a first root radius and an offset root radius located along the root portion, wherein the first root radius includes a first center and the offset root radius includes an offset center, where the offset center is located closer to the center axis of the adapter than the first center;
    wherein each root portion includes the first root radius having a different dimension than the offset root radius, the first root radius measured at the track connecting points gradually transitions from the first root radius into the offset root radius, measured at the root midpoint;
    wherein the root midpoint is located closest to the center axis of the adapter than any other location along the inner sealing surface; and
    wherein there is an increased amount of sealing material extending radially from the inner sealing surface, at the root zone and between the track connecting points such that a thickness of the increased amount of sealing material varies between the track connecting points and is greatest at the root midpoint.

11. The adapter as recited in claim 10, further comprising a first sealing bead located along the inner sealing surface.

12. The adapter as recited in claim 11, further comprising a second sealing bead located along the inner sealing surface.

\* \* \* \* \*